(12) United States Patent
Radic et al.

(10) Patent No.: US 11,349,405 B2
(45) Date of Patent: *May 31, 2022

(54) FLYBACK CONVERTER WITH SYNCHRONOUS RECTIFIER CONTROLLER

(71) Applicant: Appulse Power Inc., Toronto (CA)

(72) Inventors: Aleksandar Radic, Toronto (CA); Nenad Vukadinovic, Toronto (CA)

(73) Assignee: Appulse Power Inc., Toronto (CA)

(*) Notice: Subject to any disclaimer, the term of this patent is extended or adjusted under 35 U.S.C. 154(b) by 35 days.

This patent is subject to a terminal disclaimer.

(21) Appl. No.: 16/925,793

(22) Filed: Jul. 10, 2020

(65) Prior Publication Data
US 2020/0343819 A1 Oct. 29, 2020

Related U.S. Application Data

(63) Continuation of application No. 16/565,057, filed on Sep. 9, 2019, now Pat. No. 10,756,640.
(Continued)

(51) Int. Cl.
| H02M 3/335 | (2006.01) |
| H02M 3/158 | (2006.01) |
| H02M 1/088 | (2006.01) |

(52) U.S. Cl.
CPC ..... *H02M 3/33592* (2013.01); *H02M 3/1588* (2013.01); *H02M 3/335* (2013.01); *H02M 1/088* (2013.01)

(58) Field of Classification Search
CPC ............. H02M 3/33592; H02M 3/335; H02M 3/1588; H02M 1/088; Y02B 70/10
See application file for complete search history.

(56) References Cited

U.S. PATENT DOCUMENTS

| 5,608,613 A | 3/1997 | Jansen |
| 8,054,655 B2 | 11/2011 | Moyer et al. |

(Continued)

FOREIGN PATENT DOCUMENTS

| EP | 2757675 A2 | 7/2014 |
| JP | 2009272255 A | 11/2009 |

OTHER PUBLICATIONS

International Search Report dated Jul. 2, 2020 for PCT Patent Application No. PCT/IB2020/052341.
(Continued)

*Primary Examiner* — Emily P Pham
(74) *Attorney, Agent, or Firm* — MLO, a professional corp.

(57) ABSTRACT

A flyback converter includes a primary side circuit to receive an input voltage signal, a secondary side circuit to generate an output voltage signal using the input voltage signal, a synchronous rectifier switch, and a synchronous rectifier controller. The synchronous rectifier controller receives an attenuated drain-source voltage signal of the synchronous rectifier switch and the output voltage signal. The synchronous rectifier controller includes a threshold voltage generator to generate a first voltage signal using the output voltage signal, a first comparator to compare the attenuated drain-source voltage signal to the first voltage signal and, in response, generate a first comparison signal, and a second comparator to compare the attenuated drain-source voltage signal to a second voltage signal and, in response, generate a second comparison signal. The synchronous rectifier controller generates a control signal for switching the synchronous rectifier switch to an ON-state based on the first and second comparison signals.

20 Claims, 9 Drawing Sheets

Related U.S. Application Data

(60) Provisional application No. 62/825,606, filed on Mar. 28, 2019.

(56) References Cited

U.S. PATENT DOCUMENTS

| | | |
|---|---|---|
| 9,246,394 B2 | 1/2016 | Deng |
| 9,923,475 B2 | 3/2018 | Kleinpenning et al. |
| 10,027,235 B2 | 7/2018 | Choi et al. |
| 10,063,131 B2 | 8/2018 | Yang et al. |
| 10,644,604 B2 * | 5/2020 | Wong ................ H02M 3/33592 |
| 2004/0125621 A1 | 7/2004 | Yang et al. |
| 2006/0018135 A1 | 1/2006 | Yang et al. |
| 2014/0003097 A1 | 1/2014 | Sakurai |
| 2014/0192575 A1 | 7/2014 | Olivik et al. |
| 2014/0268914 A1 | 9/2014 | Wang et al. |
| 2016/0111961 A1 | 4/2016 | Balakrishnan et al. |
| 2016/0261204 A1 | 9/2016 | Kikuchi et al. |
| 2017/0317598 A1 | 11/2017 | Ptacek et al. |
| 2018/0212527 A1 | 7/2018 | Kong et al. |
| 2018/0269797 A1 | 9/2018 | Vemuri et al. |
| 2019/0222131 A1 | 7/2019 | King |

OTHER PUBLICATIONS

Linear Technology, LT8309, "Secondary-Side Synchronous Rectifier Driver," pp. 1-14 [retrieved on Oct. 1, 2018] from internet: https://www.analog.com/media/en/technical-documentation/datasheets/8309fa.pdf.

Office Action dated Apr. 8, 2020 for U.S. Appl. No. 16/565,057.

* cited by examiner

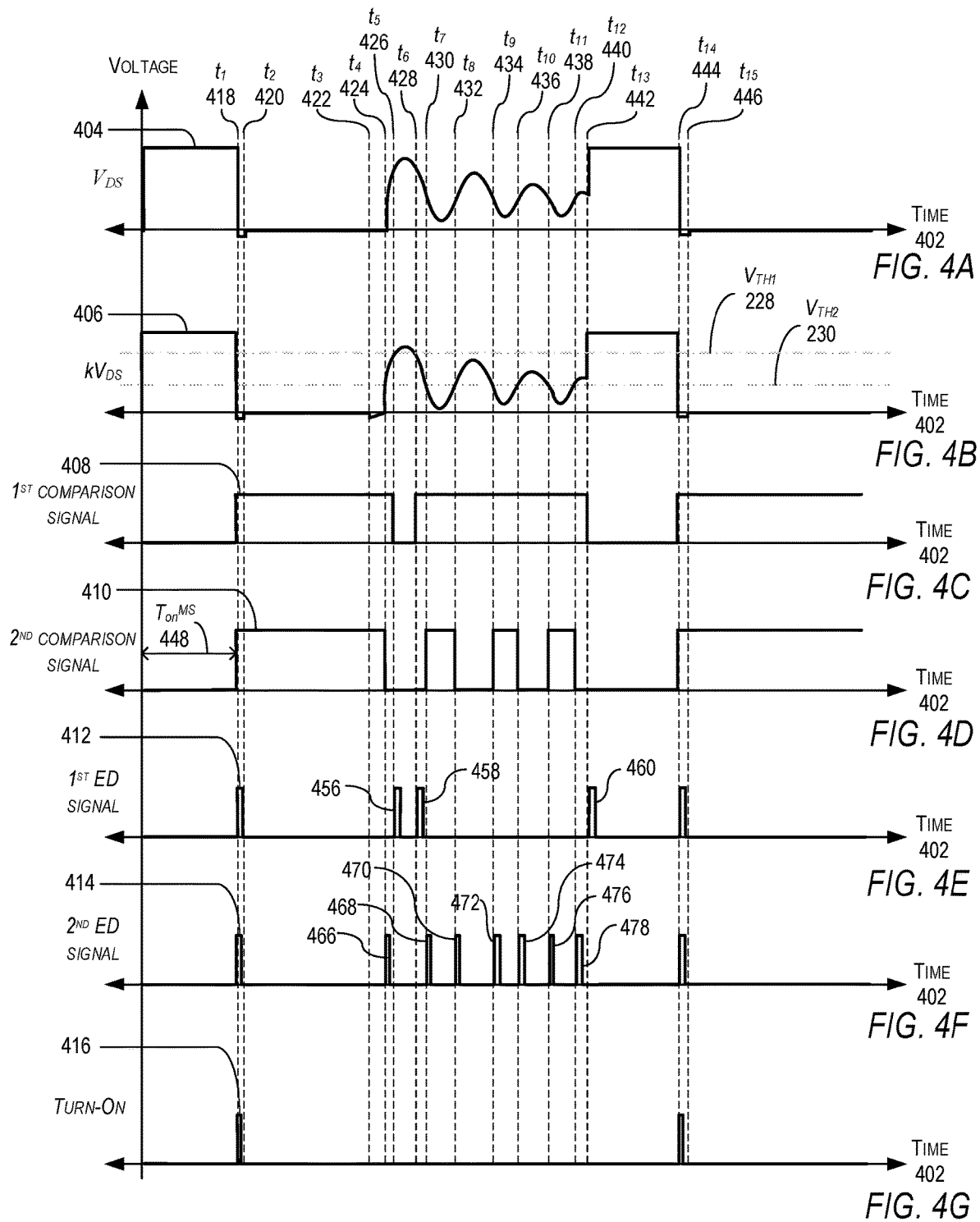

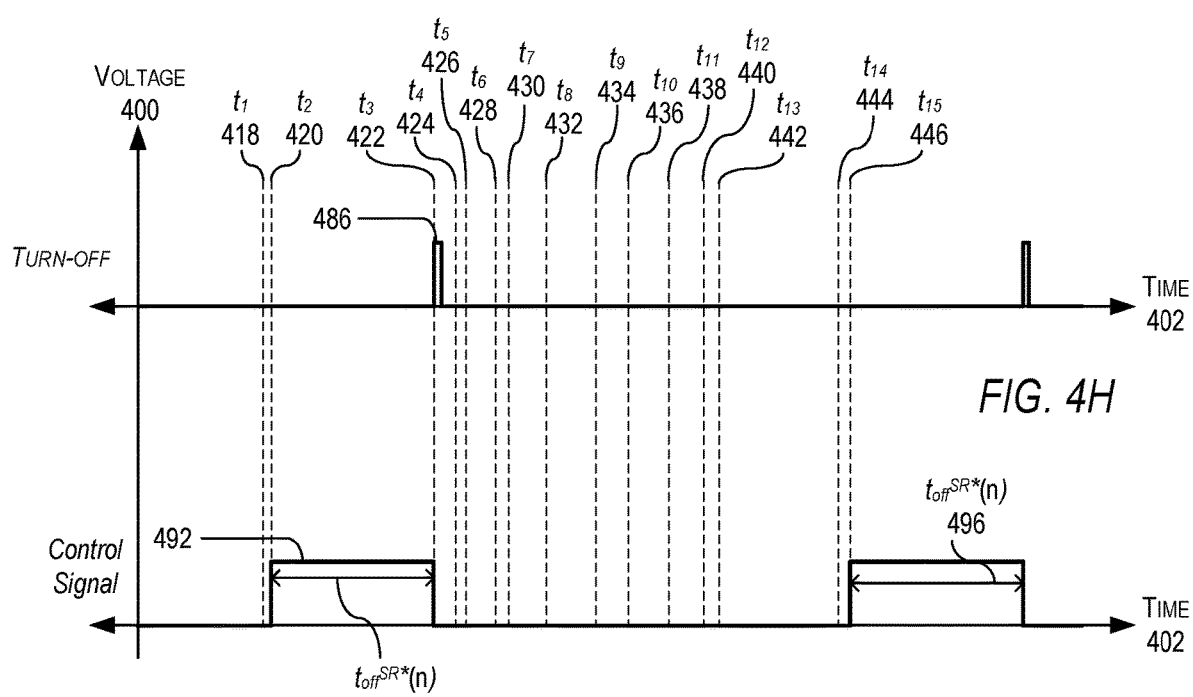

FLYBACK CONVERTER WITH SYNCHRONOUS RECTIFIER CONTROLLER

RELATED APPLICATIONS

This application is a continuation of U.S. patent application Ser. No. 16/565,057, filed Sep. 9, 2019, which claims priority to U.S. Provisional Patent Application No. 62/825,606 filed on Mar. 28, 2019 and entitled "Synchronous Rectifier Controller," all of which are hereby incorporated by reference in full.

BACKGROUND

Switch-mode power supplies (SMPSs) ("power converters") are widely utilized in consumer, industrial and medical applications to provide well-regulated power while maintaining high power processing efficiency, tight-output voltage regulation, and reduced conducted and radiated electromagnetic interference (EMI).

To meet these conflicting goals, state-of-the-art power converters (flyback converters, forward converters, boost converters, buck converters, and so on) commonly utilize quasi-resonant control methods. Quasi-resonant control methods induce a resonant waveform having sinusoidal voltage oscillations at the drains of one or more semiconductor switches of the power converter. Through well-timed control actions, the semiconductor switches are turned on at the instants where the drain voltage is minimum (i.e., valley switching), thus minimizing the semiconductor switching losses and drain-source dv/dt slope, leading to increased power processing efficiency and reduced electromagnetic interference (EMI).

Power converters often include a primary side circuit that receives an input voltage and a secondary side that outputs an output voltage that is generated using the input voltage. The primary side circuit is often coupled to the secondary side circuit by a transformer. The output voltage is typically generated using a primary side switch to control a flow of current through a primary winding of the transformer. A synchronous rectifier switch on the secondary side controls a flow of an output current. The synchronous rectifier switch is often implemented as a diode. However, diodes create power losses because of a voltage drop across the diode required to forward bias the diode. In some implementations, the diode is replaced by an actively controlled switch.

SUMMARY

In some embodiments, a flyback converter includes a primary side circuit configured to receive an input voltage signal, a secondary side circuit configured to generate an output voltage signal using the input voltage signal, a synchronous rectifier switch, and a synchronous rectifier controller in signal communication with the synchronous rectifier switch. The synchronous rectifier controller is configured to receive an attenuated drain-source voltage signal of the synchronous rectifier switch and the output voltage signal. The synchronous rectifier controller includes a first threshold voltage generator configured to generate a first voltage signal using the output voltage signal, a first comparator configured to compare the attenuated drain-source voltage signal to the first voltage signal and, in response, generate a first comparison signal, and a second comparator configured to compare the attenuated drain-source voltage signal to a second voltage signal and, in response, generate a second comparison signal. The synchronous rectifier controller is configured to generate a first control signal for switching the synchronous rectifier switch to an ON-state based on the first comparison signal and the second comparison signal.

In some embodiments, a method involves receiving an input voltage signal at a primary side circuit of a flyback converter. An output voltage signal is generated at a secondary side circuit of the flyback converter using the input voltage signal. An attenuated drain-source voltage signal of a synchronous rectifier switch of the flyback converter and the output voltage signal are received at a synchronous rectifier controller of the flyback converter. A first voltage signal is generated by a first threshold voltage generator of the synchronous rectifier controller. The attenuated drain-source voltage signal is compared to the first voltage signal by a first comparator of the synchronous rectifier controller. A first comparison signal is generated by the first comparator based on the comparison of the attenuated drain-source voltage signal to the first voltage signal. The attenuated drain-source voltage signal is compared to a second voltage signal by a second comparator of the synchronous rectifier controller. A second comparison signal is generated by the second comparator based on the comparison of the attenuated drain-source voltage signal to the second voltage signal. A first control signal for switching the synchronous rectifier switch to an ON-state is generated by the synchronous rectifier controller based on the first comparison signal and the second comparison signal.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE DRAWINGS

The disclosure may be better understood by referring to the following figures. In the figures, like reference numerals designate corresponding parts throughout the different views.

FIGS. 4A-I are plots of signals illustrating an example operation of the flyback converter shown in FIG. 1 and the synchronous rectifier controller shown in FIG. 2, in accordance with some embodiments.

DETAILED DESCRIPTION

In the following description, like reference numbers are used to identify like elements. Furthermore, the drawings are intended to illustrate the major features of example embodiments diagrammatically. The drawings are not intended to depict every feature of actual embodiments.

In general, flyback converters are configured to receive an input voltage signal at a primary side of the flyback converter and to generate an output voltage signal at a secondary-side of the flyback converter. Flyback converters often perform rectification at the secondary-side using a diode that is reverse biased (i.e., to prevent a current flow through the diode) when a main switch of the primary-side is in an ON-state, and becomes forward biased (i.e., allow a current to flow through the diode) when the main switch is in an OFF-state. The diode typically quickly transitions between reverse biased and forward biased states. However, once the diode is forward biased, power is lost across the diode during current conduction.

In this disclosure, such a diode is advantageously replaced by a synchronous rectifier switch controlled by a synchronous rectifier controller to emulate the rapid state transition of a diode while incurring less power loss during current conduction than a diode. Thus, the operation of the flyback converter as disclosed herein is more power efficient than that of a flyback converter using a diode for rectification.

The synchronous rectifier controller disclosed herein is suitable for use with flyback converters operating in discontinuous conduction mode ("DCM"), boundary conduction mode ("BCM") and/or other quasi-resonant modes of operation. The synchronous rectifier controller is advantageously suitable for integration into an integrated circuit (IC) using a low-voltage CMOS process because the synchronous rectifier controller does not rely on high-accuracy comparators having a high breakdown voltage, which often require a high-voltage CMOS process. As disclosed herein, emulated diode behavior is achieved using low voltage measurements of an attenuated drain-source voltage of the synchronous rectifier switch. Additionally, the synchronous rectifier controller advantageously has a high false turn-on rejection.

Figure 1:
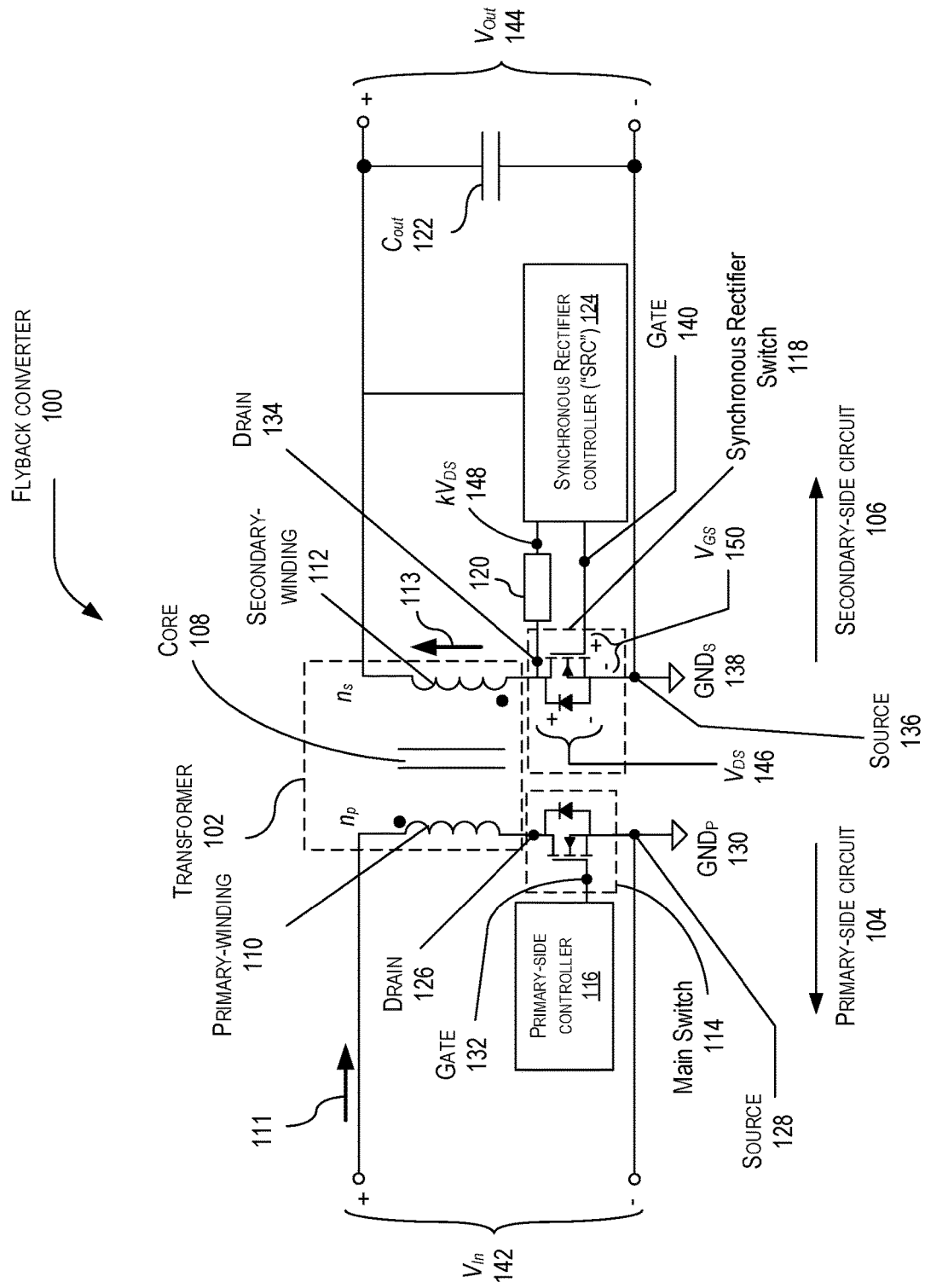
FIG. 1 is a simplified schematic diagram of an example flyback converter, in accordance with some embodiments.

In FIG. 1, a simplified schematic diagram is shown of an example implementation of a flyback converter 100, in accordance with some embodiments. The flyback converter 100 generally includes a transformer 102 that couples a primary-side circuit 104 and secondary-side circuit 106. The transformer 102 includes a transformer core 108, a primary-winding 110, and a secondary-winding 112, coupled as shown.

The primary-side circuit 104 generally includes a primary-side switch ("main switch") 114 and a primary-side controller 116. The secondary-side circuit 106 generally includes a secondary-side synchronous rectifier switch ("rectifier switch") 118, an attenuator (i.e., an attenuating impedance element, or "attenuator", having an attenuation factor of "k") 120, an output capacitor ("$C_{out}$") 122, and a synchronous rectifier controller 124.

In the example shown, the main switch 114 and rectifier switch 118 are transistors such as, for example, n-channel enhancement metal-oxide semiconductor field-effect ("MOSFET") transistors. Moreover, in the example shown, a drain node 126 of the main switch 114 is in signal communication with the primary-winding 110, a source node 128 of the main switch 114 is in signal communication with a primary-side ground ("$GND_P$") 130, and a gate node 132 of the main switch 114 is in signal communication with the primary-side controller 116. A drain node 134 of the rectifier switch 118 is in signal communication with the secondary-winding 112 and the attenuator 120, a source node 136 of the rectifier switch 118 is in signal communication with a secondary-side ground ("$GND_S$") 138, and a gate node 140 of the rectifier switch 118 is in signal communication with the synchronous rectifier controller 124. The synchronous rectifier controller 124 is also in signal communication with the attenuator 120, the secondary-winding 112, and the output capacitor $C_{out}$ 122.

In an example of operation, the flyback converter 100 converts an input voltage $V_{In}$ 142 into a DC output voltage $V_{out}$ 144 to power a load (not shown). The input voltage $V_{In}$ 142 is received at the primary-winding 110 of the transformer 102. When the main switch 114 is enabled, the input voltage $V_{In}$ 142 generates a current 111 that flows through the primary-winding 110 to charge a magnetizing inductance of the transformer 102. When the main switch 114 is disabled, the magnetizing inductance of the transformer 102 discharges, causing a current 113 to flow from the secondary-winding 112 into the secondary-side circuit 106 to generate the output voltage $V_{out}$ 144 across the output capacitor $C_{out}$ 122.

During operation of the flyback converter 100, a drain-source voltage ("$V_{DS}$") 146 develops across the drain node 134 and the source node 136 of the rectifier switch 118. The attenuator 120 generates an attenuated drain-source voltage ("attenuated voltage $kV_{DS}$") 148 that is equal to the drain-source voltage $V_{DS}$ 146 attenuated by the attenuation factor k of the attenuator 120.

Turning to the synchronous rectifier controller 124, the synchronous rectifier controller 124 generates a gate control signal ("$V_{GS}$") 150 that is injected into the gate node 140 of the rectifier switch 118. The gate control signal $V_{GS}$ 150 switches the rectifier switch 118 to an ON-state or an OFF-state based on the voltage magnitude of the gate control signal $V_{GS}$ 150.

In this example, the attenuator 120 may be configured as a resistor that is external to an IC which includes the synchronous rectifier controller 124. In such examples, the attenuator 120 is in a series circuit combination with a resistor that is internal to the IC. The series circuit combination forms a resistive voltage divider that generates the attenuated voltage $kV_{DS}$ 148 (i.e., an attenuated drain-source voltage signal) using the drain-source voltage $V_{DS}$ 146. In such examples, the attenuator 120 and the rectifier switch 118 are both external to the IC which includes the synchronous rectifier controller 124.

The synchronous rectifier controller 124 is configured to generate two reference voltages that are compared against the attenuated voltage $kV_{DS}$ 148. If the attenuated voltage $kV_{DS}$ 148 transitions to a voltage level that is less than the two reference voltages within a threshold window of time (e.g., about 2 nanoseconds, three nanoseconds, five nanoseconds, or ten nanoseconds), the synchronous rectifier controller 124 turns the rectifier switch 118 on (i.e., switches the rectifier switch to an ON-state). If the attenuated voltage $kV_{DS}$ 148 is not less than both of the two reference voltages, the synchronous rectifier controller 124 does turn the rectifier switch 118 on. Similarly, if a time for the attenuated voltage $kV_{DS}$ 148 to transition to a voltage level that is less than both of the reference voltages is longer than the threshold window of time, the synchronous rectifier controller 124 does not turn the rectifier switch 118 on. In this fashion, the rectifier switch 118 emulates the operation of a rectification diode on the secondary-side circuit 106.

Figure 2:
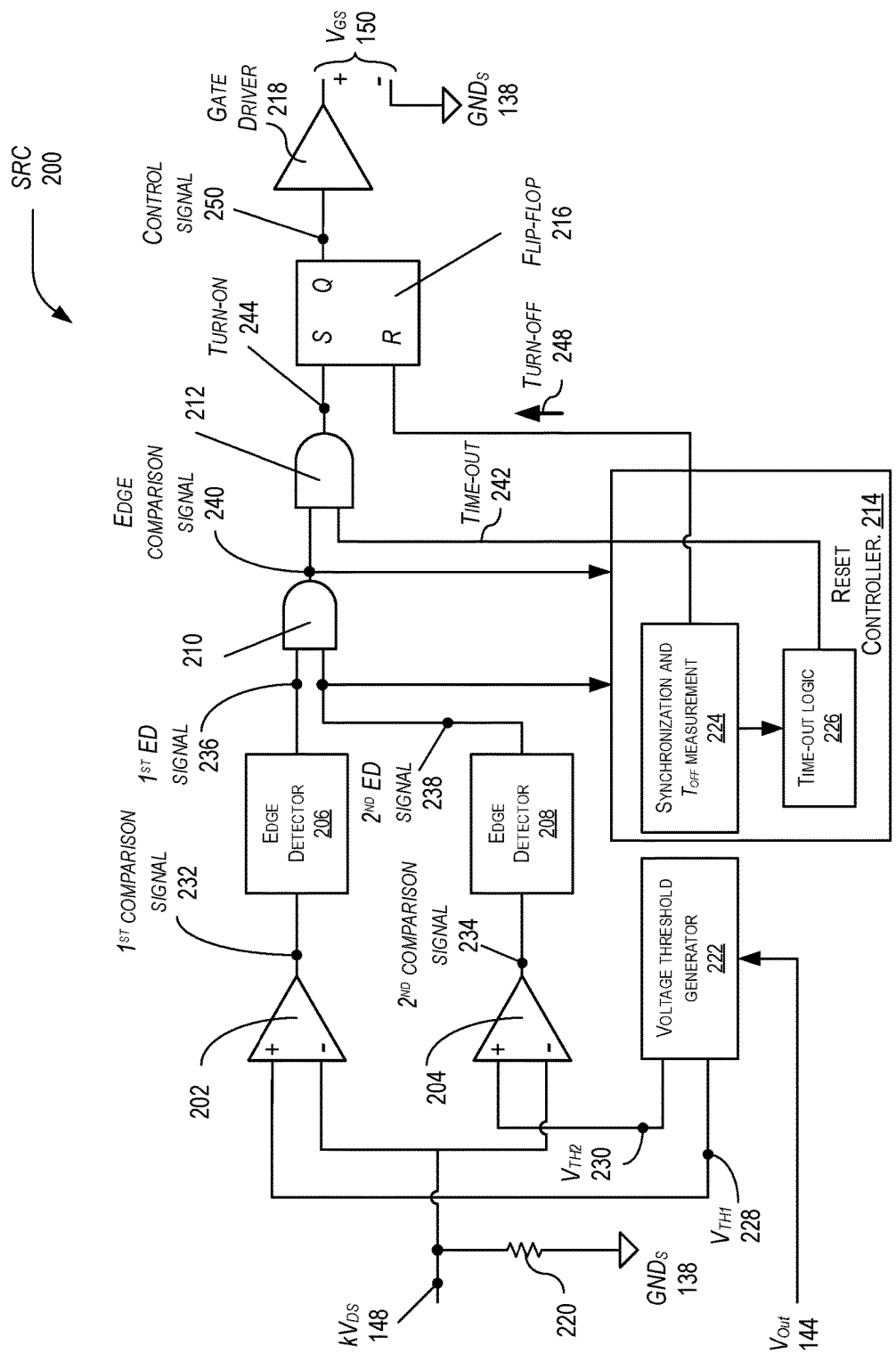
FIG. 2 is a simplified schematic diagram of an example synchronous rectifier controller of the flyback converter shown in FIG. 1, in accordance with some embodiments.

Turning to FIG. 2, a simplified schematic diagram is shown of an example synchronous rectifier controller 200 (shown in FIG. 1 as synchronous rectifier controller 124), in accordance with some embodiments. In this example, the synchronous rectifier controller 200 includes a first comparator 202, a second comparator 204, a first edge detector 206, a second edge detector 208, a third comparator 210 (e.g., an AND gate), a fourth comparator 212 (e.g., an AND gate), a reset controller 214, a flip-flop 216, a gate driver 218, and a voltage threshold generator 222, coupled as shown. The first comparator 202 and the second comparator 204 are configured to receive the attenuated voltage $kV_{DS}$ 148 through the voltage divider that includes the attenuator 120 and an internal resistor 220 that is in signal communication with GNDs 138. The internal resistor 220 in combination with the attenuator 120 forms a voltage divider that reduces the drain-source voltage $V_{DS}$ 146 of the rectifier switch 118 to the attenuated voltage $kV_{DS}$ 148.

In the example shown, the reset controller 214 includes a synchronization and $T_{off}$ measurement circuit ("$T_{off}$ circuit") 224, and a time-out logic circuit 226. In an example of operation, the voltage threshold generator 222 receives the output voltage $V_{out}$ 144 and generates a first threshold voltage ("$V_{TH1}$") 228 ("a first voltage signal") and a second threshold voltage ("$V_{TH2}$") 230 ("a second voltage signal"). The first threshold voltage $V_{TH1}$ 228 is passed to the first comparator 202 and the second threshold voltage $V_{TH2}$ 230 is passed to the second comparator 204. In this example, the second threshold voltage $V_{TH2}$ 230 may be an attenuated version of the output voltage $V_{out}$ 144 with an attenuation factor that is approximately equal to the attenuation factor k of the attenuator 120 and the first threshold voltage $V_{TH1}$ 228 is approximately equal to twice the value of the second threshold voltage $V_{TH2}$ 230. Thus, as the output voltage $V_{out}$ 144 changes, the threshold voltages $V_{TH1}$ 228 and $V_{TH2}$ 230 also correspondingly change, advantageously resulting in an automatic adjustment of the threshold voltages $V_{TH1}$ 228 and $V_{TH2}$ 230 based on the value of the output voltage $V_{out}$ 144.

The first comparator 202 and the second comparator 204 are configured to receive the attenuated voltage $kV_{DS}$ 148. In this example, both the first comparator 202 and the second comparator 204 are operational amplifiers ("op-amps"). The first comparator 202 compares the attenuated voltage $kV_{DS}$ 148 to the first threshold voltage $V_{TH1}$ 228 and the second comparator 204 compares the attenuated voltage $kV_{DS}$ 148 to the second threshold voltage $V_{TH2}$ 230. As a result of the comparisons, the first comparator 202 generates a first comparison signal ("1$^{rst}$ comparison signal") 232 and the second comparator 204 generates a second comparison signal ("2$^{nd}$ comparison signal") 234 which are passed to the first edge detector 206 and to the second edge detector 208, respectively. The first edge detector 206 receives the first comparison signal 232 and detects an edge of the first comparison signal 232 to generate a first edge detection signal ("1$^{rst}$ ED signal") 236. The second edge detector 208 receives the second comparison signal 234 and detects an edge of the second comparison signal 234 to generate a second edge detection signal ("2$^{nd}$ ED signal") 238. In this example, the first edge detector 206 and the second edge detector 208 detect both rising and falling edges of the first comparison signal 232 and the second comparison signal 234, respectively.

The edge detection signals 236, 238 are received at the third comparator 210. The second edge detection signal 238 is also received at the reset controller 214. The first edge detection signal 236 and the second edge detection signal 238 are compared by the third comparator 210 to generate an edge comparison signal 240 that is passed to the fourth comparator 212 and to the reset controller 214. If both the first edge detection signal 236 and the second edge detection signal 238 are received at the third comparator 210 at about the same time (i.e., within a one to ten nanosecond threshold window of time, as may be required by the third comparator 210), an asserted (e.g., a logic HIGH value) edge comparison signal 240 is generated by the third comparator 210. If both the first edge detection signal 236 and the second edge detection signal 238 are not received at the third comparator 210 within the threshold window of time, the asserted edge comparison signal 240 is not generated by the third comparator 210.

If a time-out signal 242, generated by the time-out logic circuit 226, is asserted, the fourth comparator 212 passes the edge comparison signal 240 to a SET terminal of the flip-flop 216. If the time-out signal 242 is de-asserted, the fourth comparator 212 does not pass the edge comparison signal 240 to the SET terminal of the flip-flop 216. Thus, the edge comparison signal 240 can be blanked (i.e., suppressed or discarded) based on timing criteria of the synchronous rectifier controller 200 (for example, during a time when the main switch 114 is on), thereby further preventing false turn-on events.

In response to receiving an asserted signal at the SET terminal (i.e., "triggering" the SET terminal) of the flip-flop 216, the flip-flop 216 generates a control signal 250 from an output terminal ("Q") that is passed to the gate driver 218. The gate driver 218 generates the gate control signal $V_{GS}$ 150 from the control signal 250 and injects the gate control signal $V_{GS}$ 150 into the gate node 140 of the rectifier switch 118 to turn on the rectifier switch 118.

After an adaptive duration of time, described with reference to FIG. 3, the $T_{off}$ circuit 224 emits an asserted turn-off signal 248 that is received at a RESET terminal ("R") of the flip-flop 216. In response to receiving the asserted turn-off signal 248, the flip-flop 216 generates control signal 250 operable to turn off the rectifier switch 118.

In this example, the first edge detection signal 236 and the second edge detection signal 238 are digital signals, and the third comparator 210 and the fourth comparator 212 are digital comparators that may be implemented as AND gates. Additionally, the flip-flop 216 may be implemented as a set-reset ("SR") flip-flop.

Figure 3:
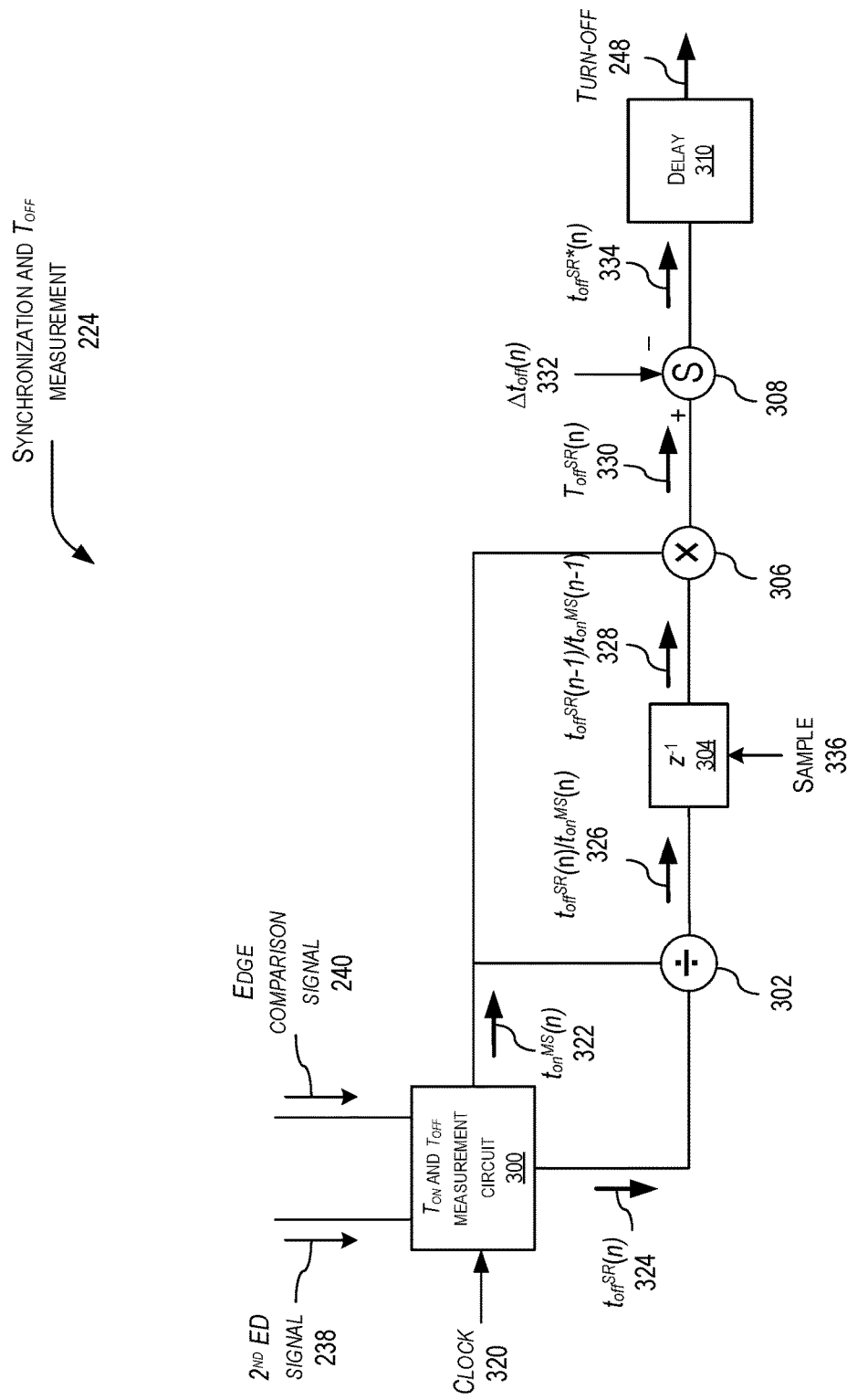
FIG. 3 is a simplified system diagram of an example synchronization and time-off measurement circuit of the synchronous rectifier controller shown in FIG. 2, in accordance with some embodiments.

In FIG. 3, a system diagram is shown of an example of an implementation of the synchronization and $T_{off}$ measurement circuit ("$T_{off}$ circuit") 224 in accordance with the present disclosure. The $T_{off}$ circuit 224 is configured to generate the turn-off signal 248 received at the RESET terminal (R") of the flip-flop 216 to turn off the rectifier switch 118 after an adjustable duration of time. The $T_{off}$ circuit 224 generally includes a time-on and time-off measurement circuit ("measurement circuit") 300, a divider element 302, a first delay element (i.e., $z^{-1}$) 304, a multiplier element 306, a signal combiner element 308, and a second delay element 310, coupled as shown. In this example, the second delay element 310 is in signal communication with the RESET terminal of the flip-flop 216 and generates the turn-off signal 248 that is injected into the RESET terminal of the flip-flop 216.

The measurement circuit 300 is configured to receive the second edge detection signal 238 and the edge comparison signal 240. In an example of operation, the measurement circuit 300 uses the second edge detection signal 238 and the edge comparison signal 240 to determine, cycle-by-cycle n, a main switch 114 on-time $t_{on}^{MS}(n)$ 322 and a rectifier switch 118 on-time $t_{off}^{SR}(n)$ 324 (i.e., an adjustable duration of time). The $T_{off}$ circuit 224 uses these determined values to adjust a current (e.g., to be used during the current switching cycle) on-time $t_{off}^{SR*}(n)$ 334 of the rectifier switch 118. That is, after the rectifier switch 118 is switched to an ON-state for a current switching cycle n, the rectifier switch 118 is switched to an OFF-state after a duration of $t_{off}^{SR*}(n)$ 334. In this example, in order to ensure that the rectifier switch 118 is turned-off before the current through the rectifier switch 118 changes direction, an intermediate estimated off-time $T_{off}^{SR}(n)$ 330 of the rectifier switch 118 is reduced by a short period $\Delta t_{off}(n)$ 332.

In this example, the measurement circuit 300 receives and measures the second edge detection signal 238 and the edge comparison signal 240 cycle-by-cycle utilizing a counting module (not shown) that may utilize a clock signal 320. The counting module may be part of the measurement circuit 300 or a separate circuit or device in signal communication with the measurement circuit 300. A ratio of $t_{off}^{SR}(n)/t_{on}^{MS}(n)$ 326 is generated by the divider element 302 and passed to the first delay element 304 which acts as a memory unit to store a previous $t_{off}^{SR}/t_{on}^{MS}(n)$ 326 value that was determined during a previous switching cycle n−1.

In this example, the first delay element 304 may be sampled by a sampling function 336 that may be, for example, the rising edge of the second comparison signal 234 (as determined via the second edge detection signal 238). In this example, by utilizing the first delay element 304 to store the ratio $t_{off}^{SR}(n-1)/t_{on}^{MS}(n-1)$ 328 from a previous switching cycle, the $T_{off}$ circuit 224 is configured to adjust the required on-time $t_{off}^{SR*}(n)$ 334 of the rectifier switch 118 as the on-time of the main switch 114 changes.

The ratio $t_{off}^{SR}(n-1)/t_{on}^{MS}(n-1)$ 328 is passed to the multiplier element 306. The multiplier element 306 multiplies the ratio $t_{off}^{SR}(n-1)/t_{on}^{MS}(n-1)$ 328 by the determined main switch on time $t_{on}^{MS}(n)$ of a current switching cycle to generate the intermediate desired on-time $T_{off}(n)$ 330 of the rectifier switch 118. The intermediate estimated on-time $T_{off}(n)$ 330 is passed to the signal combiner element 308, where an optional offset value of $\Delta t_{off}(n)$ 332 is combined with the intermediate desired on-time $T_{off}(n)$ 330 to generate the current off time $t_{off}^{SR*}(n)$ 334. In this example, the second delay element 310 compares the current off time $t_{off}^{SR*}(n)$ 334 to a count value generated by an internal counter (not shown) of the second delay element 310. When the count value generated by the internal counter of the second delay element 310 is equal to or exceeds the desired on-time $t_{off}^{SR*}(n)$ 334, the second delay element 310 generates an asserted turn-off signal 248 which is passed to the reset node of the flip-flop 216 to turn off the rectifier switch 118.

FIGS. 4A-I shows plots of various signals generated by the flyback converter 100 versus time 402, in accordance with the present disclosure. The plots include a plot 404 in FIG. 4A of the drain-source voltage $V_{DS}$ 146 of the rectifier switch 118, a plot 406 in FIG. 4B of the attenuated voltage $kV_{DS}$ 148, a plot 408 in FIG. 4C of the first comparison signal 232, a plot 410 in FIG. 4D of the second comparison signal 234, a plot 412 in FIG. 4E of the first edge detection signal 236, a plot 414 in FIG. 4F of the second edge detection signal 238, a plot 416 in FIG. 4G of the turn-on signal 244, a plot 486 of the turn-off signal 246 in FIG. 4H, and a plot 492 in FIG. 4I of the control signal 250, each across time 402.

In the example shown, the rectifier switch 118 is assumed to be initially in the OFF-state having a drain-source voltage $V_{DS}$ 146 (plot 404) that is equal to a positive voltage that is greater than zero, and the main switch 114 is in an ON-state.

The main switch 114 switches to an OFF-state at a time $t_1$ 418 and a body-diode of the rectifier switch 118 becomes positive-biased, resulting in the drain-source voltage $V_{DS}$ 146 (plot 404) dropping to approximately 0V (minus a bias voltage of the body-diode). Current flows through the body diode of the rectifier switch 118 until the rectifier switch 118 is enabled (i.e., switched to the ON-state) at time $t_2$ 420.

Resonant oscillations due to parasitic inductances and capacitances of the flyback converter 100 cause a resonant waveform to develop at the drain node 134 of the rectifier switch 118 starting at about time $t_4$ 424. The oscillations of the drain-source voltage $V_{DS}$ 146 of the rectifier switch 118 are shown as continuing through time $t_{13}$ 442. In general, the synchronous rectifier controller 124 turns off the rectifier switch 118 before $t_4$ 424 (i.e., before the start of the oscillations of the drain-source voltage $V_{DS}$ 146) to minimize conductive losses in the flyback converter 100.

In this example, the main switch 114 switches to the ON-state at time $t_{13}$ 442. The drain-source voltage $V_{DS}$ 146 increases back to the positive voltage value that was attained before $t_1$ 418. The process repeats for another cycle where the drain-source voltage $V_{DS}$ 146 again drops to approximately 0V minus the bias voltage drop of the body-diode at time $t_{14}$ 444 through time $t_{15}$.

The plot 406 of FIG. 4B shows an example of the attenuated voltage $kV_{DS}$ 148 and the two voltage thresholds $V_{TH1}$ 228 and $V_{TH2}$ 230 across time 402, in accordance with some embodiments. The plot 406 of the attenuated voltage $kV_{DS}$ 148 is proportional to the drain-source voltage $V_{DS}$ 146. The first threshold $V_{TH1}$ 228 has a voltage magnitude that is approximately twice the voltage magnitude of the second threshold $V_{TH2}$ 230.

The synchronous rectifier controller 124 estimates when the body diode of the rectifier switch 118 begins to conduct current based on the attenuated voltage $kV_{DS}$ 148 falling below both of the threshold voltages 228, 230 within the threshold window of time previously described (i.e., several nanoseconds). In this example, the attenuated voltage $kV_{DS}$ 148 (plot 406) falls rapidly at time $t_1$, causing the first comparison signal 232 (plot 408 of FIG. C) and the second comparison signal 234 (plot 410 of FIG. D) to be asserted, thereby causing the first edge detector 206 to generate an asserted first edge detection signal 236 (plot 412 of FIG. 4E) and causing the second edge detector 208 to generated an asserted second edge detection signal 238 (plot 414 of FIG. 4F). As a result, the third comparator 210 generates an asserted edge comparison signal 240. The asserted edge comparison signal 240 is received at the fourth comparator 212 during the time-out window that the time-out signal 242 is asserted, which results in an asserted turn-on signal 244 (plot 416 in FIG. 4G).

As shown in FIG. 4D, a duration 448 before time $t_1$ is representative of the on-time $T_{on}^{MS}$ of the main switch 114, and can thereby be used by the measurement circuit 300 for determining the on-time $t_{on}^{MS}(n)$ of the main switch 114.

During quasi-resonant operation of the flyback converter 100, valleys of the resonant waveform developed at the drain node 134 of the rectifier switch 118 cause spurious asserted pulses 456, 458, 460 in the first edge detection signal 236, as shown in plot 412 of FIG. 4E. Similarly, valleys of the resonant waveform cause spurious asserted pulses 466, 468, 470, 472, 474, 476, and 478 in the second edge detection signal 238, as shown in the plot 414 of FIG. 4F. However, because each of the asserted edge detection signals 236, 238 are not both received at the third comparator 210 within the threshold window of time, such spurious pulses advantageously do not result in an asserted turn-signal 244 (plot 416 in FIG. 4G).

FIG. 4H shows a plot 486 of the turn-off signal 248 across time 402, in accordance with the present disclosure. As described earlier, the turn-off signal 248 is generated by the $T_{off}$ circuit 224 after an adjustable duration of time $t_{off}^{SR*}(n)$ 496 has elapsed after the rectifier switch 118 is turned on. In this example, the plot 486 of the turn-off signal 248 includes two digital pulses at $t_3$ 422 and at a time past $t_{15}$ 446 that corresponds to a subsequent switching cycle of the flyback converter 100.

FIG. 4I shows a plot 492 of the control signal 250 across time 402, in accordance with the present disclosure. The plot 492 of the control signal 250 is generated by the flip-flop 216 in response to receiving the turn-on signal 244 (plot 416 of FIG. 4G). The control signal 250 remains in an asserted state until a duration of the desired off-time $t_{off}^{SR*}(n)$ 496 elapses, at which time the turn-off signal 248 (plot 486 of FIG. 4H) is received at the RESET terminal of the flip-flop 216, thereby causing the rectifier switch 118 to turn off.

Figure 5:
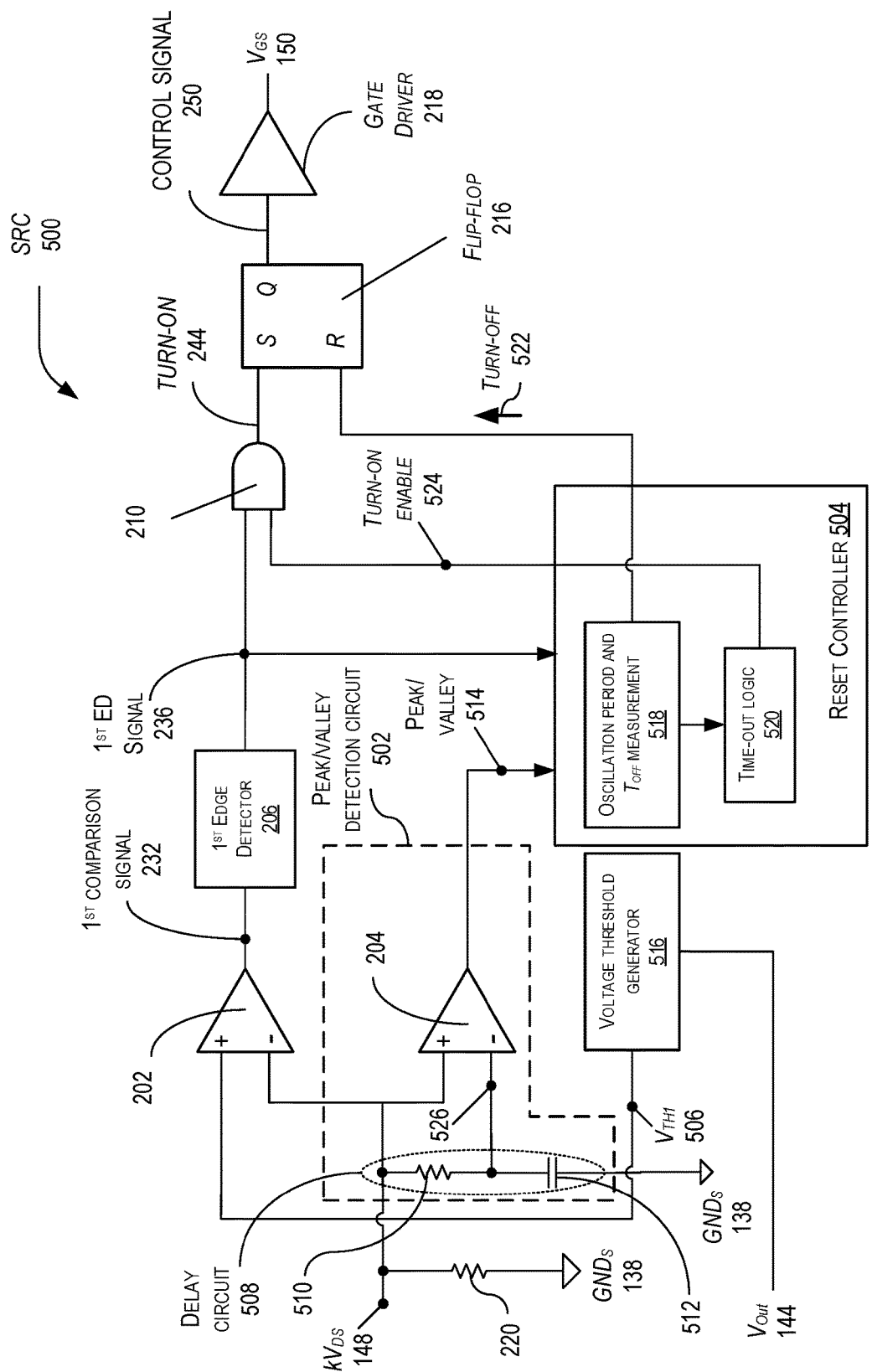
FIG. 5 is a schematic diagram of another example implementation of the synchronous rectifier controller of the flyback converter shown in FIG. 1, in accordance with some embodiments.

Turning to FIG. 5, a simplified schematic diagram is shown of another example implementation of a synchronous rectifier controller 500 (shown in FIG. 1 as synchronous rectifier controller 124), in accordance with some embodiments. Similar to the example shown in FIG. 2, in this example, the synchronous rectifier controller 500 includes the first comparator 202, the second comparator 204, the first edge detector 206, the third comparator 210, the flip-flop 216, and the gate driver 218, coupled as shown. Unlike the example shown in FIG. 2, in this example, the synchronous rectifier controller 500 also includes a peak/valley detection circuit 502, a reset controller 504, and a voltage threshold generator 516. In general, the synchronous rectifier controller 500 may be a simplified version of the synchronous rectifier controller 124 as compared to synchronous rectifier controller 200, in that the synchronous rectifier controller 500 only generates a single threshold voltage reference $V_{TH1}$ 506 and does not generate a second threshold voltage reference (such as $V_{TH2}$ 230 shown in FIG. 2). Instead of utilizing a second threshold voltage reference, the synchronous rectifier controller 500 uses a delayed version of the attenuated voltage $kV_{DS}$ 148 to determine peaks and valleys of the resonant waveform developed at the drain node 134 of the rectifier switch 118 to advantageously mitigate false-turn on events by blanking (i.e., suppressing or discarding) the first edge detection signal 236 during valley events.

In this example, the peak/valley detection circuit 502 includes the second comparator 204 and a delay circuit 508 having a resistor 510 and a capacitor 512, coupled as shown. In operation, the second comparator 204 generates a peak/valley signal 514 that is passed to the reset controller 504. The reset controller 504 includes an oscillation period and $T_{off}$ measurement circuit 518, and a time-out logic circuit 520, coupled as shown. In operation, the oscillation period and $T_{off}$ measurement circuit 518 generates a turn-off signal 522 that is injected into the RESET terminal of the flip-flop 216. The time-out logic circuit 520 generates an asserted turn-on enable signal 524 during a time-out window (e.g., a few nanoseconds), similar to the time-out logic circuit 226 described with reference to FIG. 2. In the example shown, the peak/valley detection circuit 502 generates an asserted peak/valley signal 514 in response to a detected valley of the resonant waveform developed at the drain node 134 of the rectifier switch 118. The reset controller 504 receives the asserted peak/valley signal 514 and in response generates a blanking window timeout during which time the turn-on enable signal 524 is not asserted. Thus, the reset controller 504 advantageously mitigates spurious turn-on events of the rectifier switch 118 caused by valley signals of the resonant waveform.

In an example of operation, the voltage threshold generator 516 receives the output voltage $V_{out}$ 144 and generates a first threshold voltage ("$V_{TH1}$") 506 (i.e., the first voltage signal). The threshold voltage $V_{TH1}$ 506 is passed to a positive terminal of the first comparator 202. As such, in operation, if the output voltage $V_{out}$ 144 changes, the threshold voltage $V_{TH1}$ 506 will also correspondingly change, advantageously resulting in an automatically changing first threshold voltage $V_{TH1}$ 506 based on the value of the output voltage $V_{out}$ 144.

As described before, the first comparator 202 and the second comparator 204 are also configured to receive the attenuated voltage $kV_{DS}$ 148. In this example, both the first comparator 202 and the second comparator 204 are op-amps. The first comparator 202 compares the attenuated voltage $kV_{DS}$ 148 against the first threshold voltage $V_{TH1}$ 228 and the second comparator 204 compares the attenuated voltage $kV_{DS}$ 148 against a delayed version 526 of the attenuated voltage $kV_{DS}$ 148 (i.e., a second voltage signal) to detect valleys of the resonant waveform developed at the drain node 134 of the rectifier switch 118.

As a result of the comparisons, the first comparator 202 generates the first comparison signal 232 and the second comparator 204 generates the peak/valley signal 514 which are passed to the first edge detector 206 and the reset controller 504, respectively. The first edge detector 206 receives the first comparison signal 232 and detects the edges of the first comparison signal 232 to generate the first edge detection signal 236. In this example, the first edge detector 206 is a rising edge and falling edge detector that detects both the rising and falling edges of the first comparison signal 232. The first edge detection signal 236 is passed to both the third comparator 210 and the reset controller 504.

The third comparator 210 compares the first edge detection signal 236 to the turn-on enable signal 524 to generate the turn-on signal 244 that is injected into the set "S" terminal of the flip-flop 216. In response, the flip-flop 216 generates the control signal 250 that is passed to the gate driver 218. The gate driver 218 generates the gate control signal $V_{GS}$ 150 from the control signal 250 and injects the gate control signal $V_{GS}$ 150 into the gate node 140 of the rectifier switch 118 to turn the rectifier switch 118 on, similar to the operation described with reference to FIG. 2. Upon receiving the turn-off signal 522 at the reset "R" terminal of the flip-flop 216, the rectifier switch 118 is turned off.

In this example, the first edge detection signal 236 and second edge detection signal 238 are digital signals, and the third comparator 210 is a digital comparator that may be implemented as an AND gate. Additionally, the flip-flop 216 may be implemented as a set-reset ("SR") flip-flop, coupled as shown. In operation, the turn-on signal 244 is injected into the S terminal of the flip-flop 216, the turn-off signal 522 is injected into the R terminal of the flip-flop 216, and the control signal 250 is output from the output Q of the flip-flop 216.

FIGS. 6A-E shows plots of various signals generated by the flyback converter 100 versus time 602 when the synchronous rectifier controller 124 is implemented in accordance with the synchronous rectifier controller 500 as shown in FIG. 5, in accordance with some embodiments. The plots include a plot 604 in FIG. 6A of the drain-source voltage $V_{DS}$ 146 of the rectifier switch 118, a plot 606 in FIG. 6B of the attenuated voltage $kV_{DS}$ 148, a plot 608 in FIG. 6C of the first comparison signal 232, a plot 610 in FIG. 6D of the peak/valley signal 514, and a plot 612 in FIG. 6E of the turn-on signal 244, each across time 602.

In the example shown, the rectifier switch 118 is assumed to be initially in the OFF-state having a drain-source voltage $V_{DS}$ 146 (plot 604) that is equal to a positive voltage that is greater than zero, and the main switch 114 is in an ON-state.

The main switch 114 switches to an OFF-state at a time $t_1$ 614 and a body-diode of the rectifier switch 118 becomes positive-biased, resulting in the drain-source voltage $V_{DS}$ 146 (plot 604 of FIG. 6A) dropping to approximately 0V minus the bias voltage of the body-diode of the rectifier switch 118. Current flows through the body diode of the rectifier switch 118 until the rectifier switch 118 is enabled (i.e., switched to the ON-state) at time $t_2$ 616.

Resonant oscillations due to parasitic inductances and capacitances of the flyback converter 100 cause a resonant waveform to develop at the drain node 134 of the rectifier switch 118 starting at time $t_3$ 618 and continuing through time $t_{16}$ 644. In general, the synchronous rectifier controller 124 turns off the rectifier switch 118 before $t_3$ 618 (i.e., before the start of the oscillations of the drain-source voltage $V_{DS}$ 146) to minimize conductive losses in the flyback converter 100.

In this example, the main switch 114 switches to the ON-state at time $t_{16}$ 644, and the drain-source voltage $V_{DS}$ 146 increases back to the positive voltage value which was attained before $t_1$ 614. The process repeats for another cycle where the drain-source voltage $V_{DS}$ 146 again drops to approximately 0V at time $t_{17}$ 646 and may again drop below 0V for a short time until time $t_{18}$ 648.

Figures 6A, 6B, 6C, 6D, 6E:
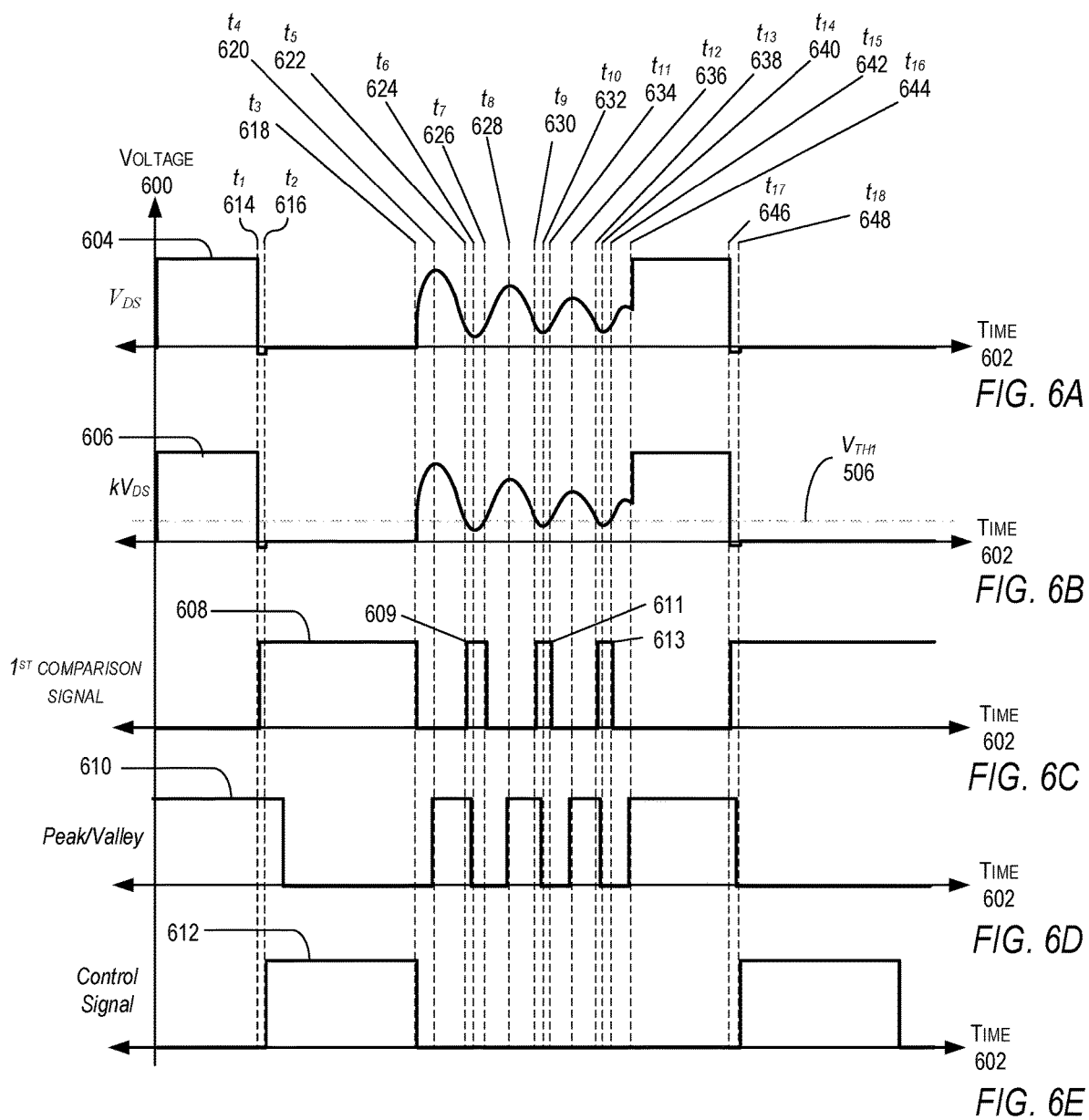
FIGS. 6A-E are plots of signals illustrating an example operation of the flyback converter shown in FIG. 1 and the synchronous rectifier controller shown in FIG. 5, in accordance with some embodiments.

The plot 606 of FIG. 6B shows an example of the attenuated voltage $kV_{DS}$ 148 and the voltage threshold $V_{TH1}$ 506 across time 602, in accordance with the present disclosure. The plot 606 of the attenuated voltage $kV_{DS}$ 148 is proportional to the drain-source voltage $V_{DS}$ 146.

The synchronous rectifier controller 124 estimates when the body diode of the rectifier switch 118 begins to conduct current based on the attenuated voltage $kV_{DS}$ 148 falling below the first threshold $V_{TH1}$ 506 during a time that the peak/valley signal 514 (plot 610 of FIG. 6D) is asserted (i.e., indicating that a valley is not detected). Similar to the example of the drain-source voltage $V_{DS}$ 146 shown in FIG. 6A, the attenuated voltage $kV_{DS}$ 148 drops to approximately zero volts at time $t_1$ 614, begins to oscillate at time $t_3$ 618, rises at time $t_{16}$ 644, and drops back to approximately zero at time $t_{17}$ 646. In this example, the attenuated voltage $kV_{DS}$ 148 (plot 606) falls rapidly at time $t_1$, causing the first comparison signal 232 (plot 608 of FIG. 6C) to be asserted. The asserted edge detection signal 236 is received at the third comparator 210 during a time that the turn-on enable signal 524 is asserted, which results in the rectifier switch 118 being enabled, as shown in plot 612 of FIG. 6E.

Valleys of the resonant waveform developed at the drain node 134 of the rectifier switch 118 cause the spurious pulses 609, 611, 613 of the first comparison signal 232 shown in plot 608 of FIG. 6C. However, because each of the spurious pulses 609, 611, 613 result in pulses from the first edge detector 206 (not shown) which are received during blanking times triggered by asserted pulses of the peak/valley signal 514 (plot 610), such spurious pulses advantageously do not result in an asserted control signal 250 (plot 612).

Figure 7:
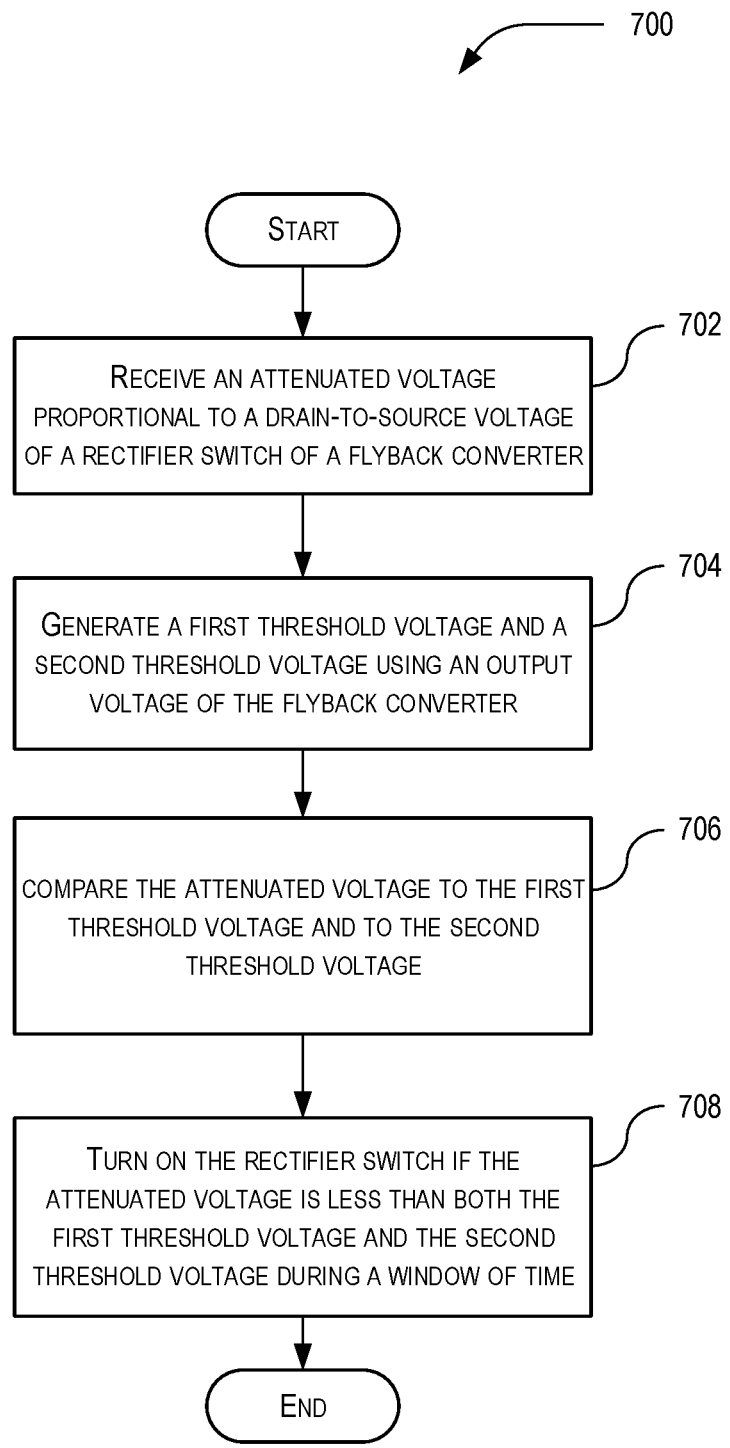
FIG. 7 is a flowchart of a portion of an example process performed by the flyback converter shown in FIG. 1 and the synchronous rectifier controller shown in FIG. 2, in accordance with some embodiments.

Turning to FIG. 7, a flowchart is shown of a portion of a process 700 performed by the flyback converter 100 using the synchronous rectifier controller 200, in accordance with some embodiments. At step 702, an attenuated voltage $kV_{DS}$ 148 that is proportional to the drain-source voltage $V_{DS}$ 146 of the rectifier switch 118 of the flyback converter 100 is received at the synchronous rectifier controller 200. At step 704, the synchronous rectifier controller 200 generates the first threshold voltage $V_{TH1}$ 228 and the second threshold voltage $V_{TH2}$ 230 using the output voltage $V_{Out}$ 144. At step 706, the attenuated voltage $kV_{DS}$ 148 is compared by the first comparator 202 and the second comparator 204 to the threshold voltages 228, 230. At step 708, the synchronous rectifier controller 200 turns on the rectifier switch 118 if the attenuated voltage $kV_{DS}$ 148 is less than the first threshold voltage $V_{TH1}$ 228 and second threshold voltage $V_{TH2}$ 230 during a threshold window of time (e.g., one to ten nanoseconds).

Figure 8:
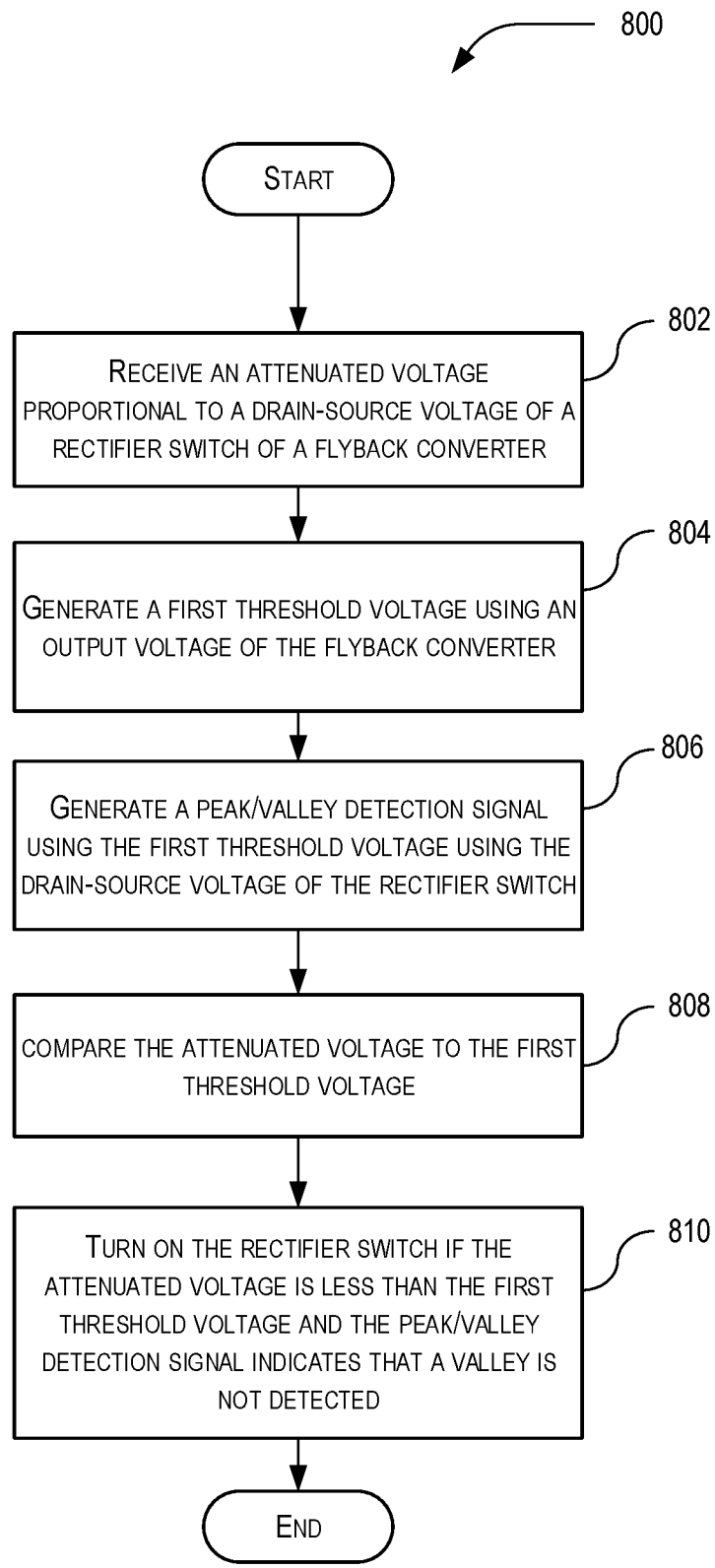
FIG. 8 is a flowchart of a portion of an example process performed by the flyback converter shown in FIG. 1 and the synchronous rectifier controller shown in FIG. 5, in accordance with some embodiments.

Turning to FIG. 8, a flowchart is shown of a portion of a process 800 performed by the flyback converter 100 using the synchronous rectifier controller 500, in accordance with some embodiments. At step 802, the attenuated voltage $kV_{DS}$ 148 that is proportional to the drain-source voltage $V_{DS}$ 146 of the rectifier switch 118 of the flyback converter 100 is received at the synchronous rectifier controller 500. At step 804, the synchronous rectifier controller 500 generates the first threshold voltage $V_{TH1}$ 228 using the output voltage $V_{Out}$ 144. At step 806, the synchronous rectifier controller 500 generates the peak/valley signal 514 using the attenuated voltage $kV_{DS}$ 148. At step 808, the attenuated voltage $kV_{DS}$ 148 is compared by the first comparator 202 to the first threshold voltage $V_{TH1}$ 228. At step 810, the synchronous rectifier controller 200 turns on the rectifier switch 118 if the attenuated voltage $kV_{DS}$ 148 is less than the first threshold voltage $V_{TH1}$ 228 and peak/valley signal 514 indicates that a valley of the quasi-resonant waveform developed at the drain node 134 of the rectifier switch 118 is not detected.

It is appreciated by those skilled in the art that the circuits, components, modules, and/or devices of, or associated with, the synchronous rectifier controller 124 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic waveguides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

Moreover, reference has been made in detail to examples of implementations of the disclosed invention, one or more examples of which have been illustrated in the accompanying figures. Each example has been provided by way of explanation of the present technology, not as a limitation of the present technology. In fact, while the specification has been described in detail with respect to specific examples of implementations of the invention, it will be appreciated that those skilled in the art, upon attaining an understanding of the foregoing, may readily conceive of alterations to, variations of, and equivalents to these examples of implementations. For instance, features illustrated or described as part of one example of an implementation may be used with example of another implementation to yield a still further example of an implementation. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. An apparatus comprising:
    a synchronous rectifier controller configured to control a synchronous rectifier switch of a flyback converter based on an attenuated drain-source voltage signal of the synchronous rectifier switch and an output voltage signal of the flyback converter, the synchronous rectifier controller comprising:
    a threshold voltage generator configured to generate a first voltage signal using the output voltage signal;
    a first comparator configured to compare the attenuated drain-source voltage signal to the first voltage signal and, in response, generate a first comparison signal; and
    a second comparator configured to compare the attenuated drain-source voltage signal to a second voltage signal and, in response, generate a second comparison signal;
    wherein:
    the synchronous rectifier controller is configured to generate a first control signal for switching the synchronous rectifier switch to an ON-state based on the first comparison signal and the second comparison signal.

2. The apparatus of claim 1, wherein the synchronous rectifier controller further comprises:
    a reset controller configured to generate a second control signal for switching the synchronous rectifier switch to an OFF-state after an adjustable duration of time.

3. The apparatus of claim 1, wherein:
    the synchronous rectifier controller is configured to generate the first control signal for switching the synchronous rectifier switch to the ON-state if the first comparison signal and the second comparison signal both transition to a same comparison state within a threshold window of time, the comparison state indicating that the attenuated drain-source voltage signal is less than the first voltage signal and that the attenuated drain-source voltage signal is less than the second voltage signal.

4. The apparatus of claim 3, wherein:
    the threshold window of time is less than ten nanoseconds.

5. The apparatus of claim 3, wherein the synchronous rectifier controller further comprises:
    a third comparator;
    a first edge detector in signal communication with the first comparator; and
    a second edge detector in signal communication with the second comparator and the third comparator;
    wherein:
    the first comparison signal is edge detected by the first edge detector to generate a first edge detection signal;
    the second comparison signal is edge detected by the second edge detector to generate a second edge detection signal;
    if the first edge detection signal and the second edge detection signal are received by the third comparator within the threshold window of time, the third comparator compares the first edge detection signal to the second edge detection signal to generate an asserted edge comparison signal, the synchronous rectifier switch being switched to the ON-state based on the asserted edge comparison signal; and
    if the first edge detection signal and the second edge detection signal are not received by the third comparator within the threshold window of time, the third comparator does not generate the asserted edge comparison signal.

6. The apparatus of claim 5, wherein the synchronous rectifier controller further comprises:
    a gate driver configured to control a gate node of the synchronous rectifier switch and configured to switch the synchronous rectifier switch to the ON-state and to an OFF-state; and
    a flip-flop having a SET terminal in signal communication with the third comparator and an output terminal in signal communication with an input terminal of the gate driver;
    wherein:

the SET terminal of the flip-flop is triggered based on the asserted edge comparison signal.

7. The apparatus of claim 6, wherein the synchronous rectifier controller further comprises:
a fourth comparator in a signal path between the third comparator and the SET terminal of the flip-flop, the fourth comparator being configured to receive the asserted edge comparison signal at a first input, to receive a time-out signal at a second input, and to trigger the SET terminal of the flip-flop based on a comparison of the asserted edge comparison signal and the time-out signal.

8. The apparatus of claim 5, wherein the synchronous rectifier controller further comprises:
a reset controller configured to switch the synchronous rectifier switch to an OFF-state after an adjustable duration of time, the reset controller being in signal communication with the second edge detector to receive the second edge detection signal, and in signal communication with the third comparator to receive the asserted edge comparison signal;
wherein:
the adjustable duration of time is determined based on one or more timing measurements of the second edge detection signal and the asserted edge comparison signal.

9. The apparatus of claim 8, wherein:
the reset controller is configured to determine an on-time of a main switch of the flyback converter using the one or more timing measurements;
the reset controller is configured to determine an on-time of the synchronous rectifier switch using the one or more timing measurements;
the reset controller is configured to determine a switch timing ratio, the switch timing ratio being a ratio of the on-time of the synchronous rectifier switch to the on-time of the main switch; and
the reset controller is configured to determine the adjustable duration of time based on the switch timing ratio.

10. The apparatus of claim 9, wherein:
the reset controller is configured to determine the adjustable duration of time by multiplying the on-time of the main switch corresponding to a current switching cycle of the flyback converter by the switch timing ratio, the switch timing ratio corresponding to a previous switching cycle of the flyback converter.

11. The apparatus of claim 1, wherein:
the second voltage signal is generated using the output voltage signal; and
the second voltage signal is about twice the first voltage signal.

12. The apparatus of claim 1, further comprising:
an attenuator in signal communication with a drain node of the synchronous rectifier switch to receive a drain-source voltage of the synchronous rectifier switch, the attenuator comprising a first resistor;
wherein:
the synchronous rectifier controller comprises a second resistor in series combination with the first resistor; and
the series combination of the first resistor and the second resistor is configured to generate the attenuated drain-source voltage signal by dividing the drain-source voltage of the synchronous rectifier switch.

13. The apparatus of claim 12, wherein:
the synchronous rectifier controller is integrated into a single integrated circuit;
the synchronous rectifier switch is external to the single integrated circuit;
the first resistor is external to the single integrated circuit; and
the second resistor is internal to the single integrated circuit.

14. The apparatus of claim 1, wherein:
the second comparison signal indicates one or more identified valleys of the attenuated drain-source voltage signal based on the comparison, by the second comparator, of the attenuated drain-source voltage signal to the second voltage signal;
the synchronous rectifier controller is configured to generate one or more blanking pulses based on the second comparison signal;
the synchronous rectifier controller is configured to generate the first control signal for switching the synchronous rectifier switch to the ON-state when the first comparison signal indicates that the attenuated drain-source voltage signal is less than the first voltage signal and when a blanking pulse is not asserted; and
the synchronous rectifier controller is configured to not generate the first control signal for switching the synchronous rectifier switch to the ON-state when the blanking pulse is asserted.

15. The apparatus of claim 14, wherein the synchronous rectifier controller further comprises:
a signal delay circuit configured to generate the second voltage signal by delaying the attenuated drain-source voltage signal.

16. A method comprising:
receiving, at a synchronous rectifier controller of a flyback converter, an attenuated drain-source voltage signal of a synchronous rectifier switch of the flyback converter and an output voltage signal of the flyback converter;
generating, by a threshold voltage generator of the synchronous rectifier controller, a first voltage signal using the output voltage signal;
comparing, by a first comparator of the synchronous rectifier controller, the attenuated drain-source voltage signal to the first voltage signal;
generating, by the first comparator, a first comparison signal based on the comparison of the attenuated drain-source voltage signal to the first voltage signal;
comparing, by a second comparator of the synchronous rectifier controller, the attenuated drain-source voltage signal to a second voltage signal;
generating, by the second comparator, a second comparison signal based on the comparison of the attenuated drain-source voltage signal to the second voltage signal; and
generating, by the synchronous rectifier controller, a first control signal for switching the synchronous rectifier switch to an ON-state based on the first comparison signal and the second comparison signal.

17. The method of claim 16, further comprising:
generating, by a reset controller of the synchronous rectifier controller, a second control signal for switching the synchronous rectifier switch to an OFF-state after an adjustable duration of time.

18. The method of claim 16, wherein:
the synchronous rectifier controller is configured to generate the first control signal for switching the synchronous rectifier switch to the ON-state if the first comparison signal and the second comparison signal both transition to a same comparison state within a threshold window of time, the comparison state indicating that the attenuated drain-source voltage signal is less than the first voltage signal and that the attenuated drain-source voltage signal is less than the second voltage signal.

19. The method of claim 18, further comprising:

generating the second voltage signal using the output voltage signal, the second voltage signal being about twice the first voltage signal.

20. The method of claim 19, wherein:

the threshold window of time is less than ten nanoseconds.

\* \* \* \* \*